May 28, 1946.  P. ORR  2,401,179
COUPLING DEVICE AND CONTROL MEANS THEREFOR
Original Filed Feb. 14, 1938
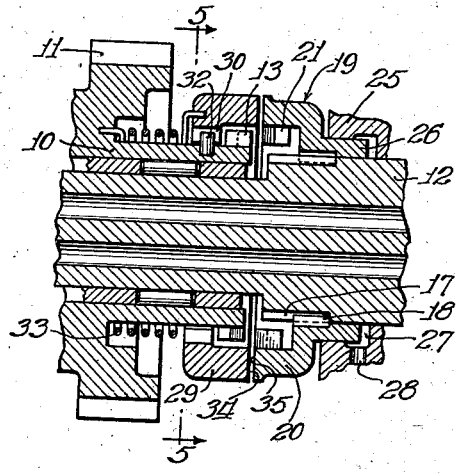
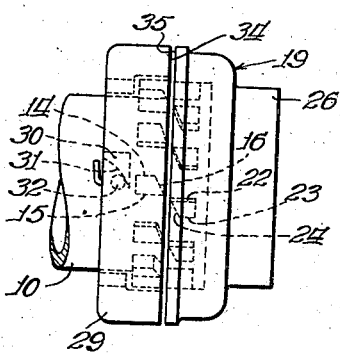
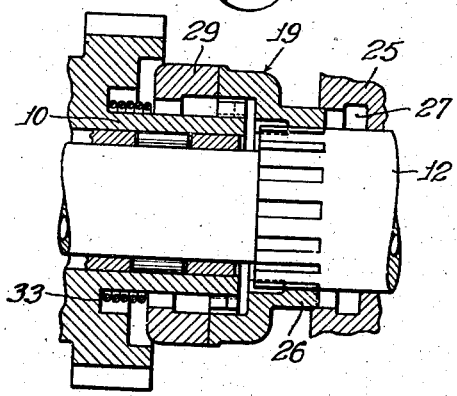
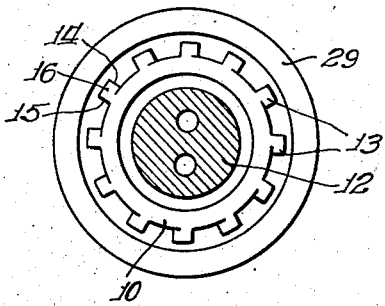
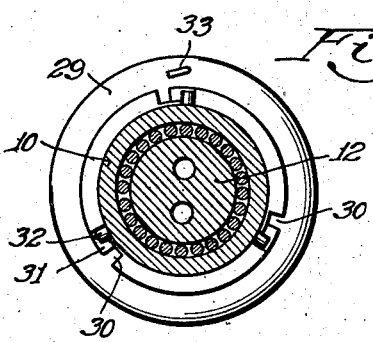
Inventor:
Palmer Orr
By:
Edward C. Fitzhaugh
Atty.

Patented May 28, 1946

2,401,179

UNITED STATES PATENT OFFICE 2,401,179

COUPLING DEVICE AND CONTROL MEANS THEREFOR

Palmer Orr, Muncie, Ind., assignor to Borg-Warner Corporation, Chicago, Ill., a corporation of Illinois Original application February 14, 1938, Serial No. 190,368, now Patent No. 2,282,591, dated May 12, 1942. Divided and this application March 30, 1942, Serial No. 436,830

3 Claims. (Cl. 192—67)

This invention relates to coupling devices of the positive type and particularly to a control means therefor.

This application is a division of my prior application Serial No. 190,368 filed February 14, 1938.

For purposes of illustration this invention will be described with reference to a positive clutch although it is understood that the invention may be applied generally to coupling devices whether both elements to be coupled are rotating or whether only one is rotating and the other is stationary.

In a well known form of positive coupling device the elements to be coupled are provided with teeth, the ends of which are chamfered to provide a camming effect between the teeth such that engagement of the elements is prevented while relative rotation occurs between the elements in a given direction. Upon reaching substantial synchronization however, and a slight relative rotation in the opposite direction, the cammed surfaces cause the teeth to engage to provide a positive drive. Such devices are popularly known as "Maybach" clutches when the elements are arranged to slide axially with respect to one another to effect engagement. The same principle has been applied to radially movable elements, notably in the form disclosed in Keller Patent No. 1,969,561, dated August 7, 1934. The movable element of such devices is usually biased toward engagement with the other element while the two elements are rotating asynchronously, thereby resulting in a period during which ratcheting occurs. This ratcheting produces an undesirable noise and also tends to batter the ends of the teeth.

The principal object of this invention is to provide a coupling device of the positive two-way type having one or more teeth on each of the elements of the device to be coupled, the ends of the teeth being chamfered to prevent engagement except upon substantial synchronization of the elements, wherein means are provided for preventing contact between the teeth until substantial synchronization is attained.

A more specific object of this invention is to provide a positive two-way clutch of the Maybach type wherein a balk ring is provided, the balk ring being responsive to asynchronous condition in the device to prevent engagement of the elements thereof.

Another object of this invention is to provide, in a self-synchronizing device of the Maybach type, means for preventing the movable element thereof from assuming an engaging position, said means being energized by the movable element itself.

These and other objects and features of this invention will become apparent from the following detailed description when taken together with the accompanying drawing in which:

Fig. 1 is a section through the novel coupling device and control therefor showing the device in disengaged position;

Fig. 2 is a plan view of the coupling device showing the shape of teeth used therein;

Fig. 3 is a section through the device showing it in engaged position;

Fig. 4 is an elevation showing the relatively fixed member of the device; and

Fig. 5 is an elevation taken in the opposite direction to that of Fig. 4 and along line 5—5 of Fig. 1 showing the balk ring.

Referring now to the drawing for a detailed description of the invention, the driving element 10 is shown in the form of a sleeve secured to rotate with a gear 11 which is rotatably mounted on a driven shaft 12. It is understood that driving element 10 could also be a shaft or any other device which is adapted to receive power. Driving element 10 is formed with one or more teeth 13, each tooth being provided with straight sides 14 and 15 and with a chamfered end 16.

Driven shaft 12 is provided with a plurality of splines 17 which engage similar splines 18 in a collar 19. Said collar 19 is thus movable axially on shaft 12 but is adapted to be rotated with said shaft. Collar 19 is enlarged at 20 to provide room for teeth 21 extending inwardly toward splines 17. Said teeth 21 are likewise provided with straight sides 22 and 23 and chamfered ends 24, the chamfer being in the same direction as the one in ends 16 of teeth 13 of the driving element. Thus when collar 19 is urged toward driving element 10, chamfered ends 16 and 24 will come into contact, and as long as collar 19 tends to move ahead of element 10 in a clockwise direction as viewed in Fig. 5, collar 19 will be ejected so that engagement cannot occur.

In the form selected for illustration collar 19 is urged into engaging position by hydraulic means. To this end driven shaft 12 is surrounded by a collector ring 25 which fits snugly over an axial extension 26 on collar 19. Said extension 26 passes into an opening 27 in collector ring 25, said opening functioning as a cylinder and extension 26 acting as a piston. A passageway 28 is provided for admitting fluid under pressure into cylinder 27 when it is desired to couple the elements of the device together. The hydraulic controls which may be used with the coupling device herein described are described in detail in the aforementioned parent application Serial No. 190,368 and hence will not be detailed here.

The means for preventing premature engagement between teeth 13 and 21 comprises a ring 29 surrounding teeth 13 and extending to the left (Fig. 1) beyond said teeth 13. A plurality of inwardly extending lugs 30 are formed in ring 29, said lugs having cam surfaces 31 disposed as shown in Fig. 2. Cooperating with each cam surface is a pin 32 extending radially outwardly from driving element 10. Ring 29 is oscillatable about the axis of driving element 10 but is constantly biased axially toward collar 19 and circumferentially toward pins 32 by a combined torsion and compression spring 33. Thus ring 29 is constantly urged in a direction such that it will oppose the axial movement of collar 19.

Ring 29 and collar 19 are provided with opposed surfaces 34 and 35 respectively which limit the relative axial movement of these elements. Said surfaces 34 and 35 constitute a friction means which tends to rotate ring 29 in the same direction as collar 19 when the surfaces are in contact. Assuming that the relative direction of rotation of collar 19 and ring 29 is clockwise as viewed in Fig. 5, the coming together of friction surfaces 34 and 35 causes ring 29 to tend to rotate in the same direction. This causes cam surfaces 31 on lugs 30 to tend to ride up on pins 32 and develop a force which opposes the axial movement of collar 19 toward teeth 13 of the driving element. The greater the relative speed in this direction the greater will be the force tending to oppose axial movement of collar 19 and hence contact between teeth 13 and 21 is prevented while such relative rotation exists. When the driving and driven elements are substantially synchronized however, and tend to rotate relative to one another in the opposite direction, ring 29 no longer tends to ride up on pins 32, but in fact is moved in the opposite direction axially and circumferentially, thereby permitting engagement of teeth 21 with teeth 13.

It will be observed that when teeth 21 and 13 are engaged, there is no relative movement between driving element 10 and collar 19, and therefore there will be no tendency to oscillate ring 29 an undue amount relative to pin 32. For this reason the release of the clutch always results in cam surfaces 31 contacting pins 32. The release of the clutch is facilitated by the restoring force provided by compressed spring 33.

It is understood that the foregoing description is merely illustrative of a preferred embodiment of the invention and that the scope of the invention therefore is not to be limited thereto but is to be determined by the appended claims.

I claim:

1. A clutch comprising an axially fixed toothed element, an axially movable toothed element adapted to interengage with said first named element, the teeth on said elements having their initially engageable surfaces so chamfered that when there is relative rotation in one direction between the elements and the elements are urged together the teeth of said elements interengage at all relative speeds of the elements, an axially movable member associated with said first named element and having a friction surface, a friction surface on said second named element adapted to engage with the friction surface on said member when said second named element is moved toward said first named element, a cam operatively connecting said axially movable member and said first named element and operative when said friction surfaces are engaged for urging said member toward said second named element to prevent engagement of the clutch when there is relative rotation in the opposite direction between said elements and allowing said member to move with said second named element toward said first named element when there is relative rotation in said one direction between the elements, and a combined compression and torsion spring between said member and said first named element for urging said member axially toward said second named element and also for urging it to rotate on said cam so that the member moves toward said second named element for preventing interengagement of the elements.

2. A clutch comprising an axially fixed toothed element and an axially movable toothed element interengageable with said first named element, a member between said elements and having a friction surface, said second named element being provided with a friction surface adapted to engage the friction surface of said member when said second named element is moved toward said first named element, fluid pressure means for moving said second named element toward said first named element, cam means operative between said member and said first named element whereby when the member is rotated in one direction with respect to the first named element it moves away from said second named element to allow interengagement between the teeth of said elements and when the member is rotated in the opposite direction it moves toward the second named element to prevent interengagement between the teeth of said elements, and spring means for urging said member toward said second named element whereby to disengage the teeth of said elements when said fluid pressure means is inoperative.

3. A clutch comprising an axially fixed toothed element and an axially movable toothed element, the teeth on said elements having their initially engageable surfaces so chamfered that when there is relative rotation in one direction between the elements and the elements are urged together the teeth of the elements interengage at all relative speeds thereof, a ring element rotatively and axially movably disposed on said first named element, said ring element and said second named toothed element having friction surfaces adapted to contact when said axially movable toothed element is moved toward engaging position with the other toothed element and adapted to be out of contact when the clutch is in its uncoupled condition prior to such movement of said axially movable toothed element, and cam means operative between said ring element and said first-named toothed element and comprising a pin fixed to one of these elements and a cam on the other of these elements, said cam means moving said ring toward said second-named toothed element for preventing engagement of said teeth when said friction surfaces are in contact and there is relative rotation in the opposite direction between the toothed elements, and said cam means permitting said ring element to move with said second named toothed element for allowing interengagement between said teeth when the friction surfaces are in contact and there is relative rotation in said one direction between the toothed elements.

PALMER ORR.